(No Model.)

J. W. HAZELRIGG
GRAIN SEPARATOR.

No. 263,177. Patented Aug. 22, 1882.

WITNESSES:
Chas. Heincke
C. Sedgwick

INVENTOR:
J. W. Hazelrigg
BY Munn & Co
ATTORNEYS.

UNITED STATES PATENT OFFICE.

JOHN W. HAZELRIGG, OF EL DARA, ILLINOIS, ASSIGNOR TO HIMSELF, WESLEY T. HAZELRIGG, VES P. HUSTEAD, AND CHARLES W. HAZELRIGG, ALL OF SAME PLACE.

GRAIN-SEPARATOR.

SPECIFICATION forming part of Letters Patent No. 263,177, dated August 22, 1882.

Application filed April 24, 1882. (No model.)

*To all whom it may concern:*

Be it known that I, JOHN W. HAZELRIGG, of El Dara, in the county of Pike and State of Illinois, have invented a new and Improved Grain-Separator, of which the following is a full, clear, and exact description.

My invention relates to improvements in grain-separators; and it consists in the peculiar construction and arrangement of parts, as hereinafter more fully described, and pointed out in the claim.

Reference is to be had to the accompanying drawings, forming a part of this specification, in which similar letters of reference indicate corresponding parts in all the figures.

Figure 1:
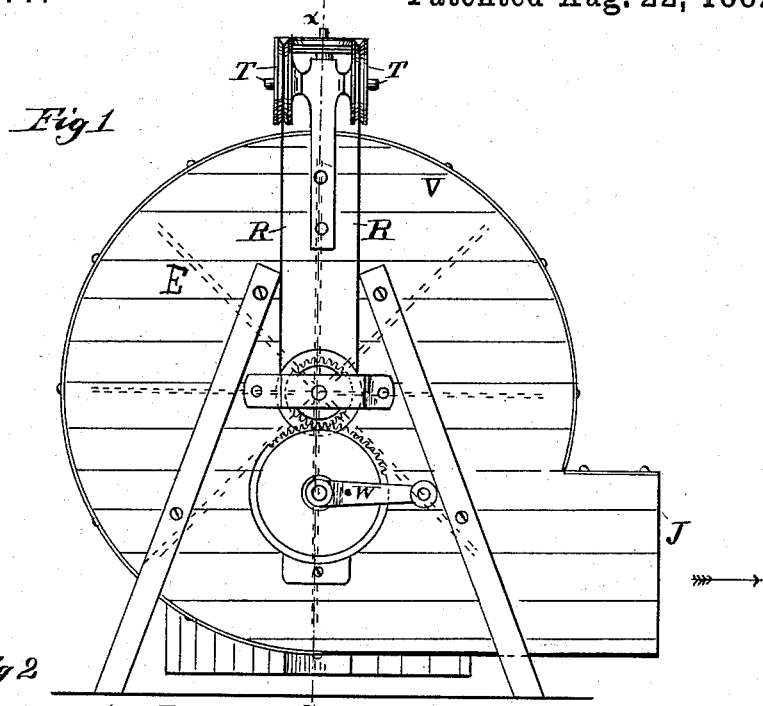
Figures 2, 3:
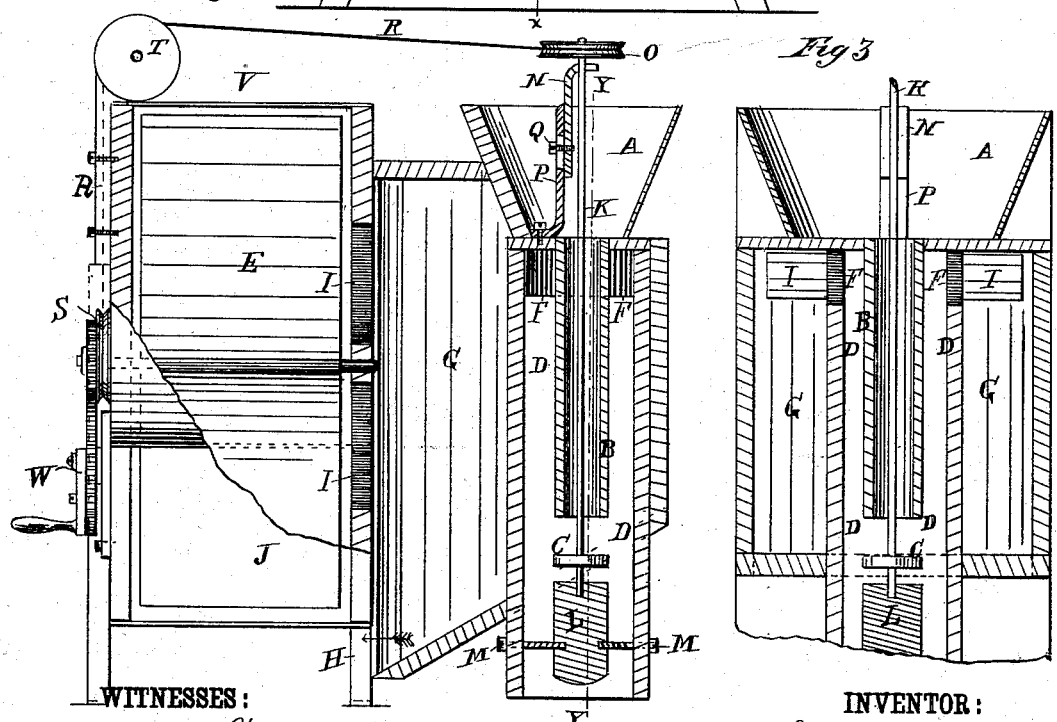

Figure 1 is a side elevation of my improved grain-separator. Fig. 2 is a sectional elevation with a part in side elevation, the section being taken on line $x$ $x$ of Fig. 1; and Fig. 3 is a section of Fig. 2 on line $y$ $y$.

A represents the hopper in which the grain to be separated is supplied. B is a vertical tube at the bottom of the hopper, through which the grain descends to the spreader C beneath the feeding-tube B to be distributed by said spreader in the flue D, up through which flue a draft is produced by the fan E to raise the chess and other light matters up along flue D and out through openings F in the sides of the flue to deliver the said chess and other light matters into the box G. The heavier particles fall to the bottom of the box G, and are discharged from the same through the opening H into a suitable receptacle, the chaff and other light matter passing through openings I into the fan E, and are expelled therefrom at J. The spreader is mounted on the lower end of a shaft, K, having a step in the block L in the lower part of flue D, and the block is supported and vertically adjusted by set-screws M, so that the grain can escape past it. The same shaft is supported at the upper end in the forked bearing N under pulley O, and is adjustable up and down on standard P by a set-screw, Q, for raising and lowering the spreader C. The shaft K is revolved by a belt, R, from a pulley on the fan-shaft, which belt passes over guide-pulleys T, located on the top of the fan-case V, suitable for the purpose. The fan is geared in the usual way to the driving-crank $w$ for being speeded to the required velocity.

The blast through the flue D may be varied at will by varying the speed of the hand-crank to be suited to the weight of the grain and the matters to be separated from it, so that it will be seen that the machine is alike useful for different kinds of grain.

I am aware that it is not broadly new to separate the chaff and other light matters from grain by a current of air passing upwardly through a flue down which the grain falls, the lighter particles passing through the fan or other machine producing the upward current through the flue, and I therefore lay no claim to such invention.

Having thus described my invention, I claim as new and desire to secure by Letters Patent—

A grain-separator comprising the box G, provided with the discharge-opening H at its lower end, the fan E, having openings I, communicating with the box G, the flue D, having openings F, communicating with the box G, the hopper A, the tube B, communicating therewith, the adjustable block L, the shaft K, provided with the spreader C, and the adjustable supports N P, substantially as and for the purpose set forth.

J. W. HAZELRIGG.

Witnesses:
  V. P. HUSTEAD,
  ALONZO DAVIS.